H. C. HANSEN.
PRINTER'S RULE, LEAD, AND SLUG CUTTER.
APPLICATION FILED NOV. 2, 1911.
Reissued Dec. 5, 1911. 13,331.
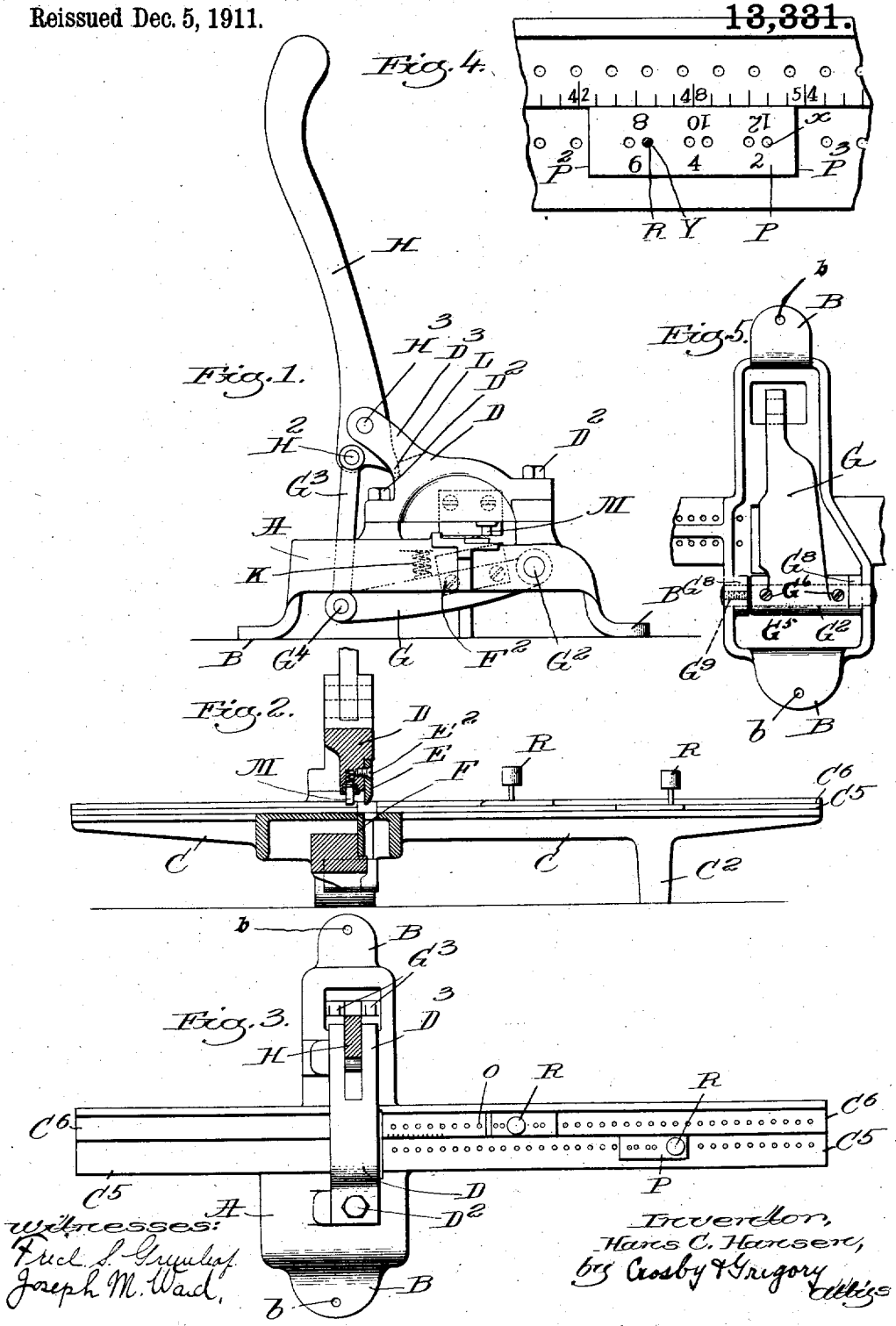

UNITED STATES PATENT OFFICE.

HANS C. HANSEN, OF NEWTON, MASSACHUSETTS.

PRINTER'S RULE, LEAD, AND SLUG CUTTER.

13,331. Specification of Reissued Letters Patent. Reissued Dec. 5, 1911.

Original No. 1,006,207, dated October 17, 1911, Serial No. 465,144. Application for reissue filed November 2, 1911. Serial No. 658,285.

*To all whom it may concern:*

Be it known that I, HANS C. HANSEN, a citizen of the United States, residing at Newton, in the county of Middlesex and State of Massachusetts, have invented an Improvement in Printers' Rule, Lead, and Slug Cutters, of which the following description, in connection with the accompanying drawing, is a specification, like reference characters on the drawing representing like parts.

This invention relates to a machine for cutting strips of metal or other material into pieces of the desired length, and is primarily designed for use in cutting up brass rules, leads and slugs, such as are employed in printing.

The object of the invention is to provide such a cutter which will properly support the material to be cut, regardless of the length of the pieces to be cut, and will insure the pieces being cut to the desired length with precision and accuracy.

The object also is to perform the cutting in such a way that the pieces cut off will be straight and flat and not curved or bent by the action of the cutter, as is usually the case with cutters now in use.

The object also is to present a device in which the parts shall be strong and durable, and so arranged as to secure the cutting of heavy and thick pieces, as well as light and thin pieces, with the application of comparatively small power.

The object is also to provide means for gaging the length of the pieces cut off with accuracy, whatever the length thereof may be.

The invention will appear more fully from the accompanying description and drawings, and will be particularly pointed out in the claims.

The drawings represent a preferred form of device embodying the invention, and suitable for use as a printer's rule, lead and slug cutter.

In the drawings, Figure 1 is an end elevation of the device. Fig. 2 is a front elevation, partially in cross-section. Fig. 3 is a top plan view. Fig. 4 is a detail to show the gage and the means for positioning it. Fig. 5 is a bottom plan view of a portion of the device.

The device comprises a base A, preferably of cast-iron, presenting two legs B, by means of which it may be fastened to a table or bench by screws or bolts passing through the holes *b*.

The base A has attached thereto and preferably formed integrally therewith, a support C for the material to be cut. This support extends transversely to and at each side of the base A, and is preferably provided at one side with a depending leg $C^2$, serving to steady and support the device. The base is provided with a cap-piece D, rigidly fastened thereto in any suitable manner, as by means of the bolts $D^2$.

The cutting action is performed by two shearing blades, the upper of which is fixed and the lower of which is movable. The upper fixed shearing blade E is rigidly but removably mounted in the cap-piece D by means of screws $E^2$. The lower or movable shearing blade F is rigidly but removably mounted by means of screws $F^2$, upon a lever G, fulcrumed in the base A at $G^2$ and operated by links $G^3$, connecting the forward end $G^4$ of the lever G to one end $H^2$ of a hand lever H. The lever H is fulcrumed at $H^3$ in a forked projecting portion $D^3$, of the cap-piece D.

The material support C is provided on its upper surface with two parallel guideways $C^5$, $C^6$. The guideway $C^5$ is comparatively deep, and adapted to receive and support comparatively thick and heavy material, such as the heavier rules, leads, and slugs, and this guideway is located nearer to the pivoted end or fulcrum of the lever G carrying the movable shearing blade F, while the other of said guideways $C^6$, is comparatively shallow, being adapted for comparatively thin rules, leads and slugs, and is located farther away from the fulcrum point of the lever G. Both of these guideways on one side extend to a point in close proximity to the movable shearing blade, while on the other side they extend to a point a slight distance from the fixed shearing blade. At the latter side of the fixed shearing blade there is left, therefore, a space, and this space is carried down through the base A so that small pieces cut off by the shearing blades may fall through to the table or bench below.

The lever G at its rear or fulcrum end is formed with an extended transverse bearing $G^5$ in which is secured by means of set screws $G^6$ a comparatively long journal pin $G^2$. The journal pin $G^2$ is mounted in bearings $G^8$ widely separated by being formed in opposite sides of the base A so that a very long bearing or fulcrum for the lever G is secured, resulting in great strength of parts and preventing any sidewise or twisting movement of the movable shearing blade. A set screw $G^9$ passes through one side of the base and bears against the end of the bearing end $G^5$ of the lever G, thus insuring a tight fit of the lever in the bearings.

The fulcrum axis or fulcrum point of the lever G, as will appear from Fig. 1, is located in the rear of and below the level of the guideways and the fixed shearing blade, so that as the lever G swings upwardly to make the cut the rear end of the movable shearing blade F will on the heavy strips carried in the guideway $C^5$ begin to cut at the rear end, giving a drawing cut by means of which the heavy material is readily severed. In the case of the thin material supported in the guideway $C^6$, the shearing blade F will have assumed a position nearly parallel to the fixed shearing blade before it begins to cut, and will thus sever the thin material quickly.

The arrangement of the parts thus described enables the power to be applied most effectively in cutting the heavy material, as well as in cutting the light material. The arrangement of the fulcrum point $H^3$ of the lever H and the connection of this lever with the lever G by means of the link $G^3$ is such that a movement of the hand-lever H through an angle of about 90° is sufficient to cut the material, no matter what its character, and the hand-lever comes into a position approximating the horizontal when the heaviest cutting work is to be done, thus enabling the power to be applied most effectively.

A coiled spring K is seated between the upper surface of the lever G and the base A to insure the return of the parts to open position. The hand lever H is also provided with a projection L, engaging a recess in the cap D by means of which the movement of the hand-lever H into its upright position is limited. A spring-pressed pin M is mounted in the cap-piece D above the deeper guideway $C^5$, on the inner side of the movable shearing blade, and serves to steady the end of the material after a piece has been cut off therefrom, the movable shearing blade carrying the material up against this pin.

The material to be cut is placed upon the guideway $C^5$ or $C^6$, according to the thickness of the material from the feeding side, with its end projecting over the movable shearing blade F and beneath the fixed shearing blade E, the length of the piece to be cut off being determined in any suitable manner as by means of the gages mounted upon the guideway and to be hereinafter described. The depression of the hand-lever H causes the shearing blade F to rise, lifting the material against the fixed shearing blade E and holding it steadily and firmly until the shearing cut is effected. Small pieces when cut off will fall through the opening beneath the fixed shearing blade to the table or bench, while larger pieces will extend over on to the guideway beyond the stationary blade and be supported thereby until removed therefrom.

Any suitable form of gage may be used for determining the length of the pieces to be cut off, but the gage herein illustrated is particularly designed for securing accurate results. The gages are shown in duplicate, one for each guideway, and since they are similarly constructed but one need be described, and this is shown more in detail in Fig. 4.

A row of graduations is placed along the adjacent edges of the guideways $C^5$ and $C^6$, the zero of which is at the cutting edge of the shearing blades, and each of these graduations may, for example, represent one 12 point em such as employed as a standard by printers. Each guideway is provided with a row of holes O, which are spaced apart a distance equal to, or an even multiple of, the graduations of the scale. In order not to weaken the support, and to avoid having the holes close together, these holes are herein shown as spaced apart a distance equal to two graduations of the scale, or two 12 point ems.

The gage itself comprises a metal plate P, fitting in and movable on the guideway, and in the form shown is arranged to be adjusted for every two points from 2 to 12, the end of the gage $P^2$ being used when 2, 4 and 6 points are to be gaged, and the opposite end $P^3$ being used when 8, 10 and 12 points are to be gaged. Owing to the fact that the holes O are spaced two 12 point ems apart the gage is provided with a pair of holes for each sub-division, rather than a single hole, and members of the pair are spaced one em apart, so that one hole may be used to correspond with the evenly numbered graduations of the scale, and the other hole to correspond with the odd numbered graduations of the scale. The holes marked 2, 4 and 6 are so laid off from the end $P^2$ of the gage that when they are in register with one of the holes of the guideway the edge of the gage will be correspondingly 2, 4 or 6 points away from the graduations of the scale, and in the same manner when the gage is turned around to make the edge $P^3$ available the subdivisions of 8, 10 and 12 points are secured. The same holes can be made use of for 2, 4 and 6 as well as 12, 10 and 8 points respectively, because the same unit of sub-division, viz., two points is used. In using the gage a pin R is placed through the holes which are alined to secure the desired result. For example, if it is desired to cut off a strip of metal forty-two, 12 point ems in length, the pin R would be placed in one of the holes marked 12, which represents the zero point. The edge $P^3$ would be placed approximately against the graduation 42, and it would at once be seen which hole was the proper one. In the construction illustrated the hole X would be found to aline with a hole O, which would bring the edge $P^3$ directly in line with the graduation 42. If an odd numbered graduation was desired, as forty-three 12 point ems, the gage would be shoved back the distance between the holes 12 and the pin inserted in the other hole 12 from that used for an even numbered graduation, which would bring the edge $P^3$ in line with the graduation 43. When a sub-division of the 12 point ems was desired, as for example 6 points, the edge of the cutter $P^2$ would be placed in approximately the position desired, as midway between the graduations 43 and 42 and the pin R inserted in one of the holes 6. In the case of an even graduation the hole Y would be found the proper one, while in the case of an odd graduation the other hole would be used. It will thus be seen that in this manner any desired graduation may be attained readily and simply and that the gage is firmly held and locked in place by the pin R.

The gage used for the shallow guideway $C^6$ is preferably beveled at the edge $P^3$ used for 2, 4 and 6 points, to enable it to pass beneath the fixed shearing blade, which is necessary in order to secure small sub-divisions.

Having described my invention, what I claim as new and desire to secure by Letters Patent, is:

1. A cutter comprising an upper fixed shearing blade, a support extending transversely to and at each side of and below said shearing blade and presenting a guideway, a lower shearing blade, a lever carrying said lower shearing blade and pivoted at one end below the level of and in rear of said guideway, means for operating said lever to raise the material against the fixed shearing blade to sever the same.

2. A cutter comprising an upper fixed shearing blade, a support presenting parallel, deep and shallow guideways and extending transversely to and at each side of and below said shearing blade, a lower shearing blade, a lever carrying said lower shearing blade and pivoted at one end below the level of and back of said deep guideway, and means for operating said lever to raise the material against the fixed shearing blade and sever the same.

3. A cutter comprising an upper fixed shearing blade, a support presenting parallel, deep and shallow guideways extending transversely to and at each side of and below said fixed shearing blade, a lower shearing blade, a lever carrying said lower shearing blade and pivoted at one end below the lower level of and back of said deep guideway, means for operating said lever, said guideways at one side extending from a point close to said movable shearing blade and at the other side from a point slightly distant from said fixed shearing blade, whereby small pieces cut off may drop through the support at the side of and beneath the fixed shearing blade.

4. A cutter comprising an upper fixed shearing blade, a support presenting a guideway extending transversely to and at each side of and below said shearing blade, a lower shearing blade, a lever supporting said lower shearing blade and provided with a fulcrum extending transversely to and at each side of the fixed shearing blade, the said fulcrum being located below the level of and back of said guideway, means for operating said lever whereby material placed in the guideway is brought up against the fixed shearing blade and severed by said shearing blades.

5. A cutter comprising an upper fixed shearing blade, a support extending transversely to and at each side of and below said shearing blade and presenting a guideway, a lower shearing blade, a lever carrying said lower shearing blade and pivoted at one end below the level of and in rear of said guideway, means for operating said lever to raise the material against the fixed shearing blade to sever the same, and a spring-pressed pin mounted at the side of the fixed shearing blade and above the movable shearing blade.

6. A cutter comprising an upper fixed shearing blade, a support extending transversely to and at each side of and below said shearing blade and presenting a guideway, a lower shearing blade, a lever carrying said lower shearing blade and pivoted at one end below the level of and in rear of said guideway, a hand lever fulcrumed above the guideway, and a link connecting the hand lever and the opposite end of the lever carrying the lower shearing blade whereby upon the depression of the hand lever the material resting on the guideway is raised against the fixed shearing blade to sever the same.

In testimony whereof, I have signed my name to this specification, in the presence of two subscribing witnesses.

HANS C. HANSEN.

Witnesses:
MABEL PARTELOW,
THOMAS J. DRUMMOND.

Copies of this patent may be obtained for five cents each, by addressing the "Commissioner of Patents, Washington, D. C."